United States Patent
Hendrix et al.

(10) Patent No.: US 6,742,973 B1
(45) Date of Patent: Jun. 1, 2004

(54) CARRYING APPARATUS, DEVICE AND METHOD FOR USE

(76) Inventors: Carl M. Hendrix, 33045 Snowbird La., Philomath, OR (US) 97370; Keith A. Hendrix, P.O. Box 731, Philomath, OR (US) 97370

( * ) Notice: Subject to any disclaimer, the term of this patent is extended or adjusted under 35 U.S.C. 154(b) by 0 days.

(21) Appl. No.: 10/144,967

(22) Filed: May 14, 2002

(51) Int. Cl.$^7$ .................. B01D 45/00; B65D 63/10
(52) U.S. Cl. ........................... 410/106; 410/34
(58) Field of Search .................... 410/101, 106, 410/110, 31, 32, 34, 36, 42, 77, 89; 296/3; 248/227.15, 229.25, 227.1, 227.2, 227.4, 228.6, 228.8, 503; 224/403, 405, 309, 329, 331, 545

(56) References Cited

U.S. PATENT DOCUMENTS

| | | | | |
|---|---|---|---|---|
| 2,887,287 A | * | 5/1959 | Ross | |
| 2,907,506 A | * | 10/1959 | Sammons | |
| 2,914,829 A | * | 12/1959 | Willemain | |
| 3,950,010 A | * | 4/1976 | Robertson | |
| 4,126,095 A | * | 11/1978 | Tillery | |
| 4,607,991 A | * | 8/1986 | Porter | 410/110 |
| 4,685,646 A | * | 8/1987 | Harrison | 410/110 |
| 4,812,093 A | * | 3/1989 | Millar, Jr. | 410/110 |
| 4,850,770 A | * | 7/1989 | Millar, Jr. | 410/110 |
| 4,953,820 A | * | 9/1990 | Yoder | 410/110 |
| 5,310,238 A | * | 5/1994 | Wheatley | |
| 5,443,341 A | * | 8/1995 | Hamilton | 410/106 |
| 5,560,576 A | * | 10/1996 | Cargill | 224/403 |
| 6,039,520 A | * | 3/2000 | Cheng | 410/106 |
| 6,059,159 A | * | 5/2000 | Fisher | 296/100.16 |
| 6,170,897 B1 | | 1/2001 | Karrer | 296/39.2 |
| 6,196,777 B1 | * | 3/2001 | Price | 410/106 |
| 6,238,153 B1 | * | 5/2001 | Karrer | 410/106 |
| 6,256,844 B1 | | 7/2001 | Wheatley | 24/265 |
| 6,270,301 B1 | * | 8/2001 | Dunlop | 410/106 |
| 6,349,910 B1 | * | 2/2002 | White | 248/231.61 |
| 6,547,311 B1 | * | 4/2003 | Derecktor | 296/100.12 |

OTHER PUBLICATIONS

Cabela's Master Catalog, Spring 2002, Edition 1, selected relevant pages.
Cabela's 2001 Archery Catalog.
Internet pages from Keeper, Fentress RoofRak dated: Apr. 18, 2002 and Mar. 22, 2002.

* cited by examiner

Primary Examiner—D. Glenn Dayoan
Assistant Examiner—H. Gutman
(74) Attorney, Agent, or Firm—Lori M. Friedman

(57) ABSTRACT

A device for anchoring and safely transporting equipment in land or water vehicles is described. The device comprises a metal hanger that is welded on one side to a flat steel bar that is bent into an offset U-shape whose top extends further than its bottom and allows the top to support a load. The device includes a metal bolt that clamps and anchors the material being transported. Other parts of the device include a metal bolt as clamping means, a movable metal rod in a T configuration on the bottom of the bolt, elastomeric fastening means, and a swivel head crimped to the top of the bolt such that the bolt and rod securely attach the hanger to a rail of a vehicle to secure the device in place. Elastomeric fastening means attach to the hanger device which a user laterally stretches across an item being transported to securely hold it in place during transport.

19 Claims, 5 Drawing Sheets

CARRYING APPARATUS, DEVICE AND METHOD FOR USE

BACKGROUND OF THE INVENTION

1. Field of the Invention

The present invention is directed to an apparatus, device and methods for anchoring equipment being transported in land or water vehicles. More specifically, the invention allows the transport of sporting and hunting goods or other elongated equipment that needs to be transported without damage to the equipment or the vehicle that transports it. The device also allows for the safe transport of large coiled objects. A pair of the devices may be attached to opposite ends of a vehicle rail and then the two ends of an elongated item are attached to each of the devices for safe transportation in the vehicle.

2. Background of the Prior Art

A major use of the device of the present invention is for transporting sporting or hunting equipment from place to place in a safe and efficient manner. Many such devices are sold in catalogs that aim their products to those involved in hunting and fishing. Companies that advertise such devices include Cabela's®, who sells equipment to hunting, fishing, boating and outdoor sporting goods enthusiasts. A specific example of an advertised device that serves a similar purpose of the instant device is the "Pack Racks™", advertised in the Cabela's Archery Catalog 2001. As stated therein, the Pack-Rack grips objects to prevent jarring by using steel forks that hold the object when a user twists the fork and locks a wing nut. The device of the present invention is structurally distinct from the Pack-Rack.

An item such as the Cabela's Pack-Rack does not attach to the rail of a vehicle or have a surface for transported items to rest on. Objects being transported in the Pack-Rack are squeezed into a V-shaped holder.

Cabela's web site, www.cabelas.com. This device feature rubber coated aluminum hooks that flex to custom fit the equipment it transports, and includes Velcro® straps to secure the carried object in place. The device of the instant invention does not use hooks as securing means, and does not use Velcro® but uses an elastomeric device that securely holds the transported device in place during transport. Further, the ATV Bow/gun rack is designed for attachment to an all-terrain vehicle (cycle) and not designed for use in a pick-up truck bed or boat.

Another Cabela's device from their web site is a "Rackmount™" that allows fishing rods to be held on the roof of a motor vehicle. The instant invention is not limited to being mounted on the roof of a land vehicle and is not limited to holding just fishing rods and reels.

Another advertised device meant to hold and transport sporting equipment is the Fentress Roof Rack, which is designed to utilize a vehicle's luggage rack to transport rods and reels, Again, the design and capabilities of the Fentress device is patentably distinct from the instant invention.

Still another device for cargo control of sporting goods is the Keeper®, sold by the Keeper Corporation on its web site www.keepercorp.com. This device serves as an anchor point for attachment of tie-downs in the bed of pickup trucks. No single anchor point can compare to the manner in which the instant device firmly fixes elongated articles while being transported.

There are many, many devices advertised on various other web sites which are literally too countless to name. Regarding patented prior art, there is a Tie-Down Anchor Assembly disclosed by Wheatley in U.S. Pat. No. 6,256,844. In this disclosure, Wheatley describes a tie-down anchor assembly attached to the side-rail of a pickup truck. Wheatley's anchor assembly is a tie-down made for securing loads, and is not especially designed to safely carry elongated items. The bolt as described in '644 clamps to the top of a side of a pickup truck bed rail and not straight up and down as does the securing bolt of the present invention. The anchor tie-down that protrudes from a pickup truck bed is not as secure as the fastenable carrying device that applicants describe herein.

Furthermore, the device described by Wheatley requires tools for its installation and operation. Applicants' invention requires no additional or special tools for its attachment to a vehicle. No drilling is required for its installation.

In another patent, U.S. Pat. No. 6,170,897. Karrer describes a cargo anchoring and protection system a bed liner. In this invention, a system is devised for anchoring and protecting cargo in the entire bed of a pickup truck which includes a plurality of sections and many separate pieces of equipment. The instant invention is a relatively small and inconspicuous device which does not have to be permanently installed in a vehicle, and does not involve the entire cargo bed of a truck but is simply mounted on a pickup truck's side rail.

The current invention describes a carrying device that attaches in a temporary manner to the inside of the rail bed of a pickup truck, automotive roof rack, the upper edge of the side of a boat (gunwale), and the like to restrain and protect cargo while being transported in the vehicle. The items being anchored and transported may be elongated articles often used in camping or sporting activities such as hunting, fishing, and archery which are valuable to their owners and are in need of protection while being transported. More specifically, typical articles that benefit from protection and restraint during transport include fishing rods, fishing rods and reels, archery bows, and construction tools and building equipment such as levels, conduit, pipe used for irrigation purposes (metal or PVC), shovels, hoes, rakes, pitch forks, post hole diggers, ladders, string trimmers, sledge hammers, pry bars and the like.

The items being anchored and transported may also be coiled items such as power cords, rope, extension cord, hose, electric wires, and plastic or copper tubing used in plumbing. Either elongated or coiled items that need to be transported securely and without damage are well-suited to the apparatus and methods of this invention.

To aid in the protection afforded elongated articles being transported, the devices of this invention are coated in a synthetic polymer plastic (such as vinyl) or rubberized paint. The device's protective coating also protects it from rust or other degradation resulting from outdoor use. Other materials that are commonly used to protect outdoor equipment are plastisols, bituminous paint, or two-part reactive chemical coatings. The protective coating that is used not only protects the various parts of the instant invention, it also protects the finish of any item being transported by the apparatus of the invention, and the finish of the transporting vehicle's rails.

To further the protection of the carried item, the invention provides a padded foam rubber cushion on the horizontal part of the hanging device of the instant invention that is between the bottom of the hanger and the equipment carried by the device. The padded piece is made to cover the horizontal section of the U-shaped metal piece of the hanger in which the transported item rests. The foam rubber cushion may be removed for cleaning or replacement as desired by the user.

Also attached to the bottom of the hanger is an elongated stretchable elastomeric fastening means, which is firmly fitted to the bottom of the hanger and is pulled by the user in a direction lateral to the elongated article being transported. The user will pull the fastening means from its attachment to the anchor to stretch it over the elongated item being transported. This manner of anchoring the elongated item is more secure than using a Velcro® device for anchoring, as has been used in the prior art, as well as insuring no scratching of the vehicle or the item being transported. The stretchable fastening means is another non-metal member of the hanger device of this invention, and it is also removable and replaceable as desired by the user.

The present invention allows for an easy and inexpensive solution to the difficulties common in prior art devices and to serve the needs of those who need to safely transport elongated and/or coiled items. The apparatus of the invention is sold in pairs and designed to securely hold items while being transported in a vehicle. Further details of the present invention will become clear in the drawings and detailed description that follow.

DETAILED DESCRIPTION OF PREFERRED EMBODIMENTS

The apparatus, device, and methods described and claimed herein are geared to the sports enthusiast who uses a pickup truck to transport his equipment to the outdoor location where it will be used. The sportsman usually spends significant money on his equipment and is eager to transport it safely and without damaging it. If the sportsman is a fisherman, he will also appreciate the time this invention will save him from dis- and re-assembling his rods and reels.

Figure 1:
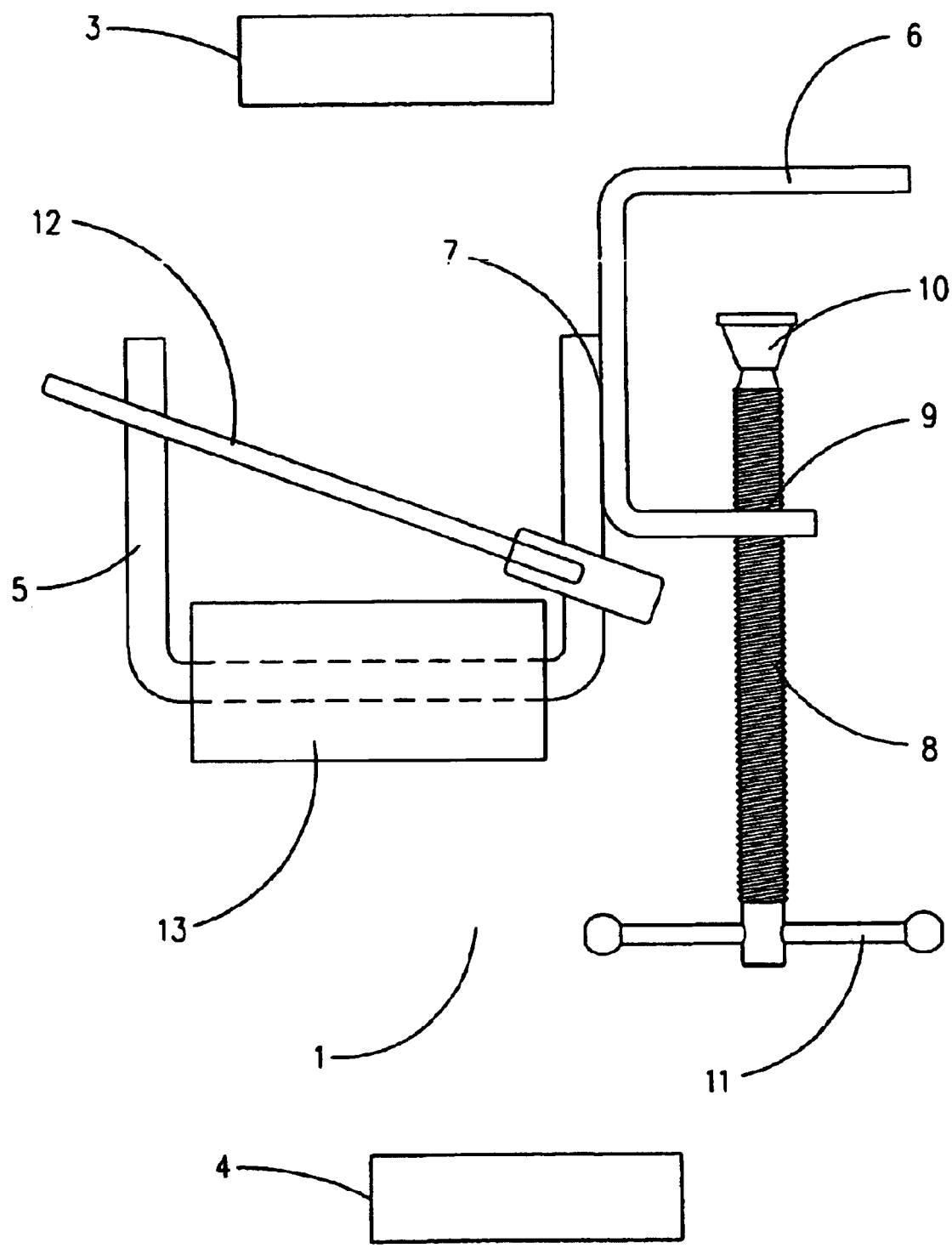
FIG. 1 is a side view of the carrying apparatus of the present invention with two labeled rectangular boxes; one representing an automotive roof rack and the other representing various tools that are transported using a device of this invention.

Referring now to the figures, FIG. 1 depicts a side view of the device 1 of this invention. As can be seen in FIG. 1, the carrying apparatus utilized for the safe transportation of items in a vehicle comprises a hanger rod 5 that is made of mild steel, aluminum or similar durable metal strong enough to support the items being transported. The construction material of the device 1 of this invention therefore may be metal such as various grades of hot-rolled steel, various grades of cold-rolled steel, or from stainless steel, titanium, aluminum, and the like. Factors involved in choosing a construction material include durability, tensile strength, hardness, and cost.

The hanger rod 5 is bent into a U-shaped with a horizontal span and two vertical spans of approximately equal lengths. The size of the hanger rod 5 can be varied depending on the size of the items to be carried and transported and the vehicle used; the size of the hanger rod 5 can range from about two inches to about tree inches long and with a diameter from $\frac{1}{8}$" to $\frac{1}{2}$". The manufacturer would easily vary the size of the hanger rod 5 and have a variety of devices to satisfy the diverse need of users, vehicles and equipment carried.

As can be seen in FIG. 1, hanger rod 5 is welded to a flat steel bar 6 bent into a flat U-shape with its top extending out further than its bottom. This allows the top part of steel bar 6 to be able to support the load held by the hanger rod 5.

FIG. 1 also depicts the permanent attachment of the hanger rod 5 and metal bar 6 into welded solid piece 7. The part of the hanger rod 5 that holds the item being transported is at a right angle to the welded piece 7.

Welded piece 7 has two sides; as pictured in FIG. 1, the left side is where it attaches to the hanger rod 5 and the right side is where is attaches to the flat steel bar 6. The bottom of the flat steel bar 6 is where a bolt 8 is present and is used to secure the apparatus to a rail of a vehicle. The bolt 8 is typically from $\frac{1}{4}$ to $\frac{1}{2}$ inch in diameter, a comparable size metric thread may also be used.

Further describing the bolt 8 as clamping means of the apparatus, the bolt 8 is made of a metal that is compatible with the metal of the device 1. In this invention, 'compatible' will mean that the bolt 8 and the device 1 are made of materials that will not degrade or react with each other, even under conditions of moisture and/or high temperature. For further rust protection, the bolt 8 is coated or impregnated with zinc and may also be coated with a rust inhibitor. It also may be made from a non-ferrous metal.

The bolt 8 may be up to four inches in length with a securing T rod 11 is about two inches in length. The metal bolt 8 is threaded along its entire length and attached at its bottom perpendicularly to a movable metal rod in a T configuration on the bottom of the bolt 8. A swivel head 10 is crimped to the top of the bolt 8 such that the bolt 8 and rod 11 securely attach the device 1 to the inside of a pickup bed rail 21 to the secure the device in place. The swivel head 10 is a critical feature of the hanger device of this invention; it allows for a snug fit even if the surface of the underside of the bed rail 21 of a pickup truck is uneven.

Depicted in FIG. 1 is the hole 9 which is drilled and tapped by the manufacturer to fit the bolt and thread utilized for a particular device. Also depicted in FIG. 1 as 12 is the elastomeric fastening means that is manually stretched by a user across the item being transported (not shown) and across the hanger rod 5 to secure the item in place during transport.

On the hanger rod 5 is a piece of foam rubber 13 that has a hole 12a in its center to accommodate the hanger rod 5. The foam rubber 13 piece is further protects the items being transported from damage. It may be made of urethane, latex, or visco-elastic foam rubber, or any similar widely available protective foam.

Figure 3:
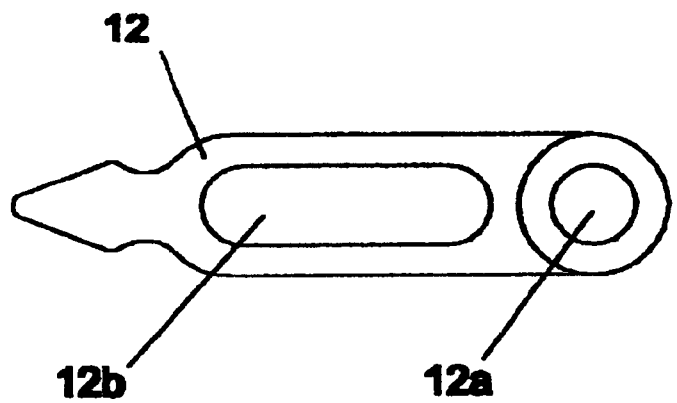
FIG. 3 is a detailed view of the elastomeric fastening means that holds the transported item in place while in transit.

FIG. 3 shows a detailed picture of the elastomeric fastening means 12. FIG. 3 shows the round hole 12a that slips over the hanger rod 5. The oblong portion 12b of fastening means 12 is manually stretched by a user laterally across the item held to secure the item in place during transport. The elastomeric fastening means 12 may be made of any natural or synthetic rubber material suitable for the purpose of outdoor transportation of items. Synthetic rubber used for this purpose would be treated with appropriate amounts of antidegradents as utilized by rubber manufacturers.

Figure 2:
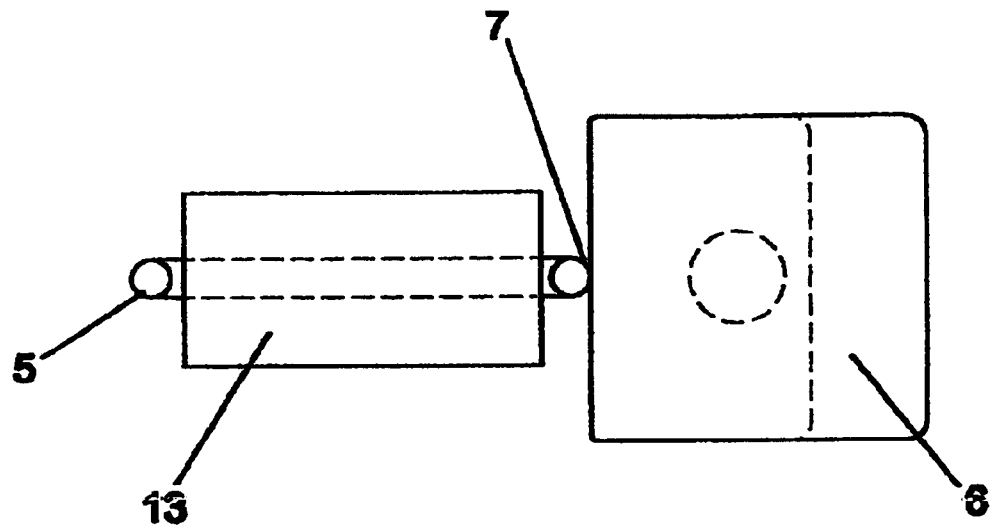
FIG. 2 is a top view of the carrying apparatus of the present invention

FIG. 2 shows a top view of the carrying apparatus of the present invention. Points of interest of FIG. 2 are the hanger rod 5, the flat steel bar 6, the welded piece 7, and the foam rubber protector 13.

Figure 4:
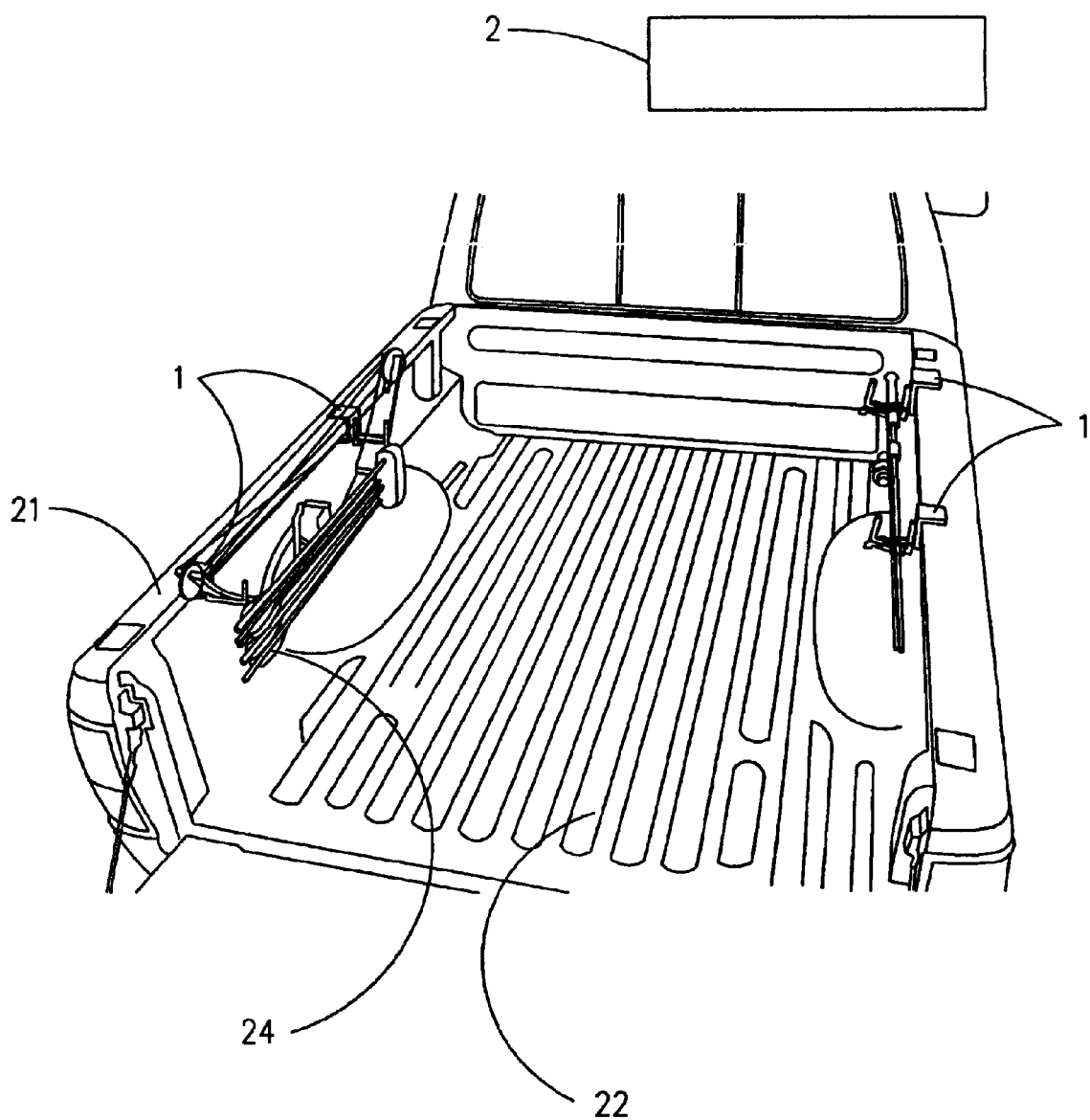
FIG. 4 is a photograph of a pickup truck with an apparatus of the present invention on each bed rail with a labeled rectangular box representing a user of this invention.

FIG. 4 shows the bed 22 of a pickup truck with a pair of the devices 1 of the invention attached to both side rails 21 of the truck. In FIG. 4, each pair of devices is holding different elongated items 24. In another embodiment, a pickup truck or other vehicle with more than one side rail 21 would be able to carry elongated devices 24 on one of the side rails 21 and the other one could hold coiled items 23.

Figure 5:
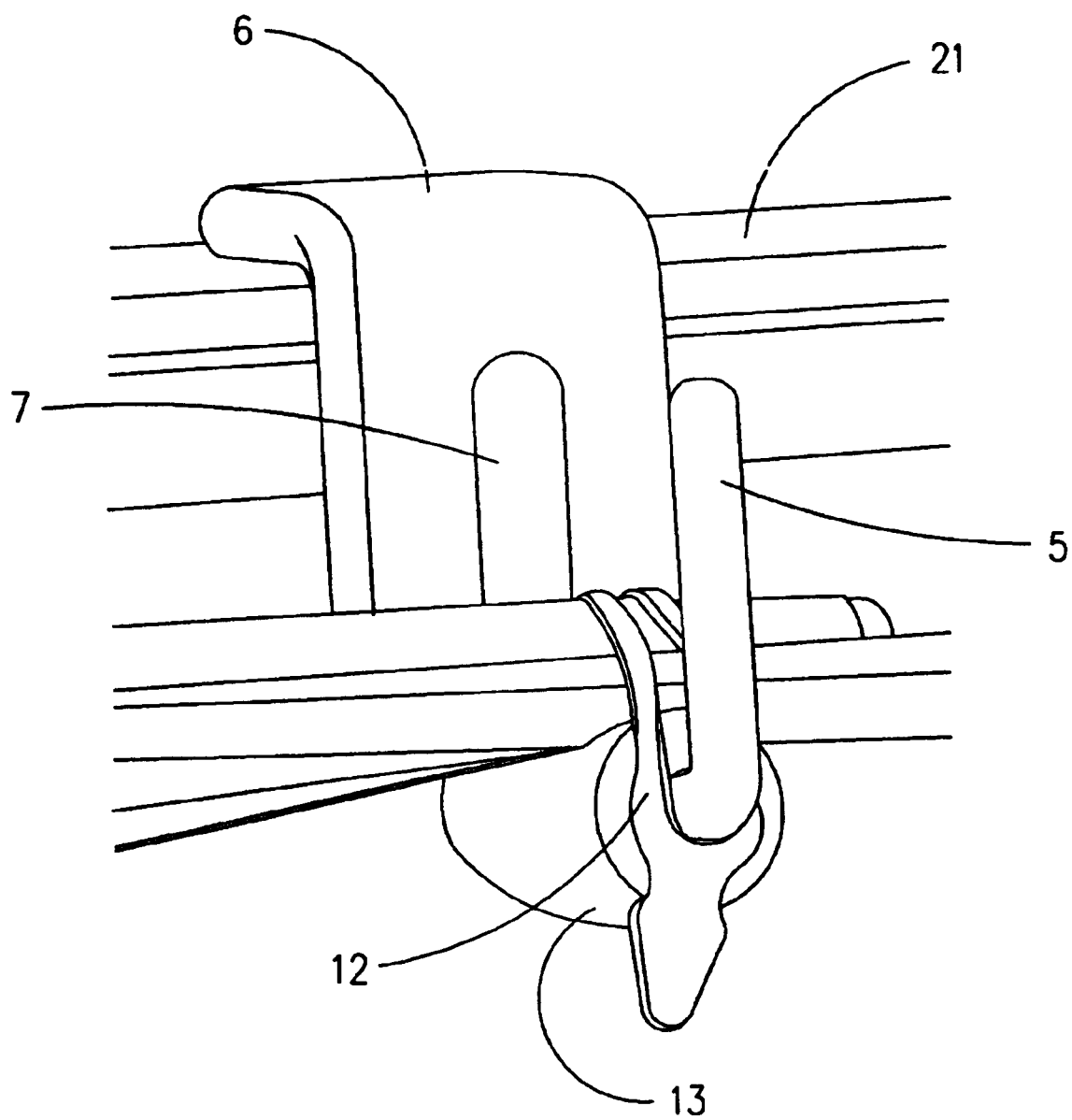
FIG. 5 is a photograph of the carrying apparatus of the present invention holding an elongated item for transport in a pickup truck.

FIG. 5 is a digital photographic depiction of two devices of this invention attached to a side rail 21 of a pickup truck holding an elongate item. The top surface of the metal bar 6 is made to rest on the top surface of the side rail while the bolt 8 (not shown) has swivel head 10 (not shown) inserted to the underside of the side rail positioned to tighten against the underside of the side rail 21. The elastomeric fastening means 12 is slipped over the foam rubber protector 13 to cushion the articles being transported. The elastomeric fastening means 12 is stretched across the oblong opening 12b and hooked over the front of hanger rod 5 and pulled down against the object in the hanger to secure the load being transported.

Figure 6:
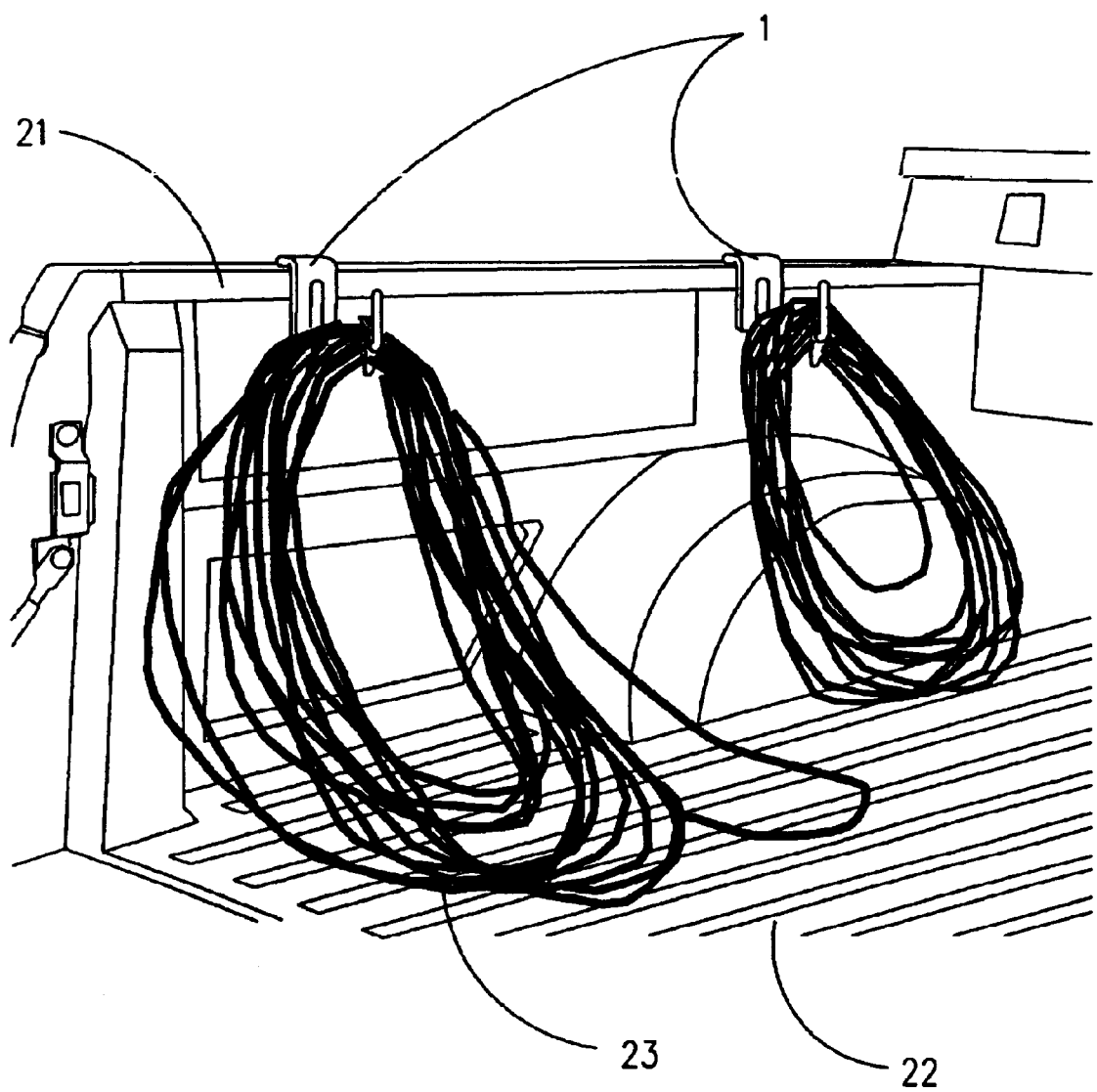
FIG. 6 is a photograph of the carrying apparatus of the present invention holding two coiled items for transport in a pickup truck

FIG. 6 is a digital photographic depiction of the apparatus of this invention attached to a side rail 21 of a pickup truck holding two coiled items 23.

Two devices 1 of the invention each hold a coiled item 23 of material which in this case are two lengths of extension cord. It should be noted that the bottom portions of the coiled material 23, are sitting in the pickup truck bed 22. When the driver of the truck transports the coiled material 23, stays safely in place while being held by the devices 1.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention:

What is claimed is:

1. A carrying apparatus for the safe transportation of items in a vehicle comprising
    a) a hanger device that is U-shaped with a horizontal span and two vertical spans of approximately equal lengths;
    b) said hanger device, having a top and a bottom, that is welded on one side to a flat steel bar that is bent into an offset U-shape whose top extends further than its bottom that allows the top to support a load;
    c) a hole drilled into the bottom of said flat steel bar to receive a threaded metal bolt as clamping means;
    d) said threaded metal bolt is attached at its bottom perpendicularly to a movable metal rod in a T configuration on the bottom of the bolt and a swivel head is crimped to the top of the bolt such that the bolt and rod securely attach the hanger device to a vertical rail inside of the vehicle to secure the device in place;
    e) a stretchable elastomeric fastening means that is attached to an inner portion of the horizontal span of the hanger device and is laterally stretched across the items being transported to securely hold the items in place during transport.

2. The carrying apparatus of claim 1 wherein the hanger device is manufactured from a durable metal that is strong enough to support the items being transported in sizes that range from about two inches to about three inches long and with a diameter from ⅛(") inch to ½(") inch.

3. The carrying apparatus of claim 2 wherein the metal bolt is compatible with the metal of the hanger device, is protected from rust in ordinary use, and is up to four inches in length and whose securing movable metal rod is about two inches in length.

4. The carrying apparatus of claim 3 wherein the metal bolt is protected from rust from treatments selected from the group consisting of zinc coating, zinc impregnation, coating with a rust inhibitor, and fabrication from a non-ferrous metal.

5. The carrying apparatus of claim 2 wherein the hanger device and clamping means are coated with a protective coating which provides protection from rust and other environmental degradation.

6. The carrying apparatus of claim 1 wherein the items that are transported are elongated items selected from the group consisting of fishing rods, fishing rods with reels, archery bows, and construction tools and building equipment such as levels, conduit, pipe used for irrigation purposes, power cords, rope, shovels, hoes, rakes, pitch forks, post hole diggers, ladders, string trimmers, sledge hammers, and pry bars.

7. The carrying apparatus of claim 1 wherein the items that are transported are coiled items selected from the group consisting of power cords, rope, extension cord, hose, electric wires, and plastic or copper tubing used in plumbing.

8. The carrying apparatus of claim 1 wherein, to further ensure the safe transport and damage protection of the items being transported, a foam-filled rubber tube is wrapped around the bottom of the hanger device which supports the items being transported.

9. The carrying apparatus of claim 1 wherein an elongated elastomeric fastening means that is firmly fitted to one side of the bottom of the hanger device is pulled by a user in a direction lateral to the item being transported and attaches to the top of the hanger device thereby stretching over the items being transported to hold them securely in place during transport.

10. The carrying apparatus of claim 1 wherein attachment to the rail bed of the vehicle is accomplished by manually adjusting the swivel head crimped to the top of the bolt to tightly fit the underside of the rail.

11. The carrying apparatus of claim 1 wherein the items being transported in a vehicle are attached in a temporary manner in locations selected from the group consisting of the inside of the rail bed of a pickup truck, an automotive roof rack, and an upper edge of the side of a boat to protect said items while being transported in the vehicle.

12. An anchoring device for safely holding items being transported comprising
    a U-shaped hanger with one horizontal span and two vertical spans of approximately equal lengths that is welded on one side to a flat steel bar that is bent into an offset U-shape, said flat steel bar has a top and a bottom, said top extends further than the bottom and allows the top to support a load; the flat steel bar is attached to clamping means that is attached to both said hanger and a separate threaded metal bolt and is attached at the bottom perpendicularly to a movable metal rod in a T configuration on the bottom of the bolt and a swivel head crimped to the top of the bolt such that the bolt and rod securely attach the anchoring device to an inside rail of a vehicle to secure the device in place and a stretchable rubber fastening means that is attached to an inner portion of the horizontal span of the hanger that securely holds said load being transported.

13. The anchoring device of claim 12 wherein a foam-filled rubber tube is wrapped around the horizontal span to further protect the load being transported.

14. The anchoring device of claim 12 wherein the stretchable rubber fastening means on the bottom of the hanger is pulled by a user in a direction lateral to the load held and is manually attached to the top of the hanger.

15. The anchoring device of claim 13 wherein the foam-filled rubber tube and rubber fastening means may be removed by a user from the hanger for replacement as needed.

16. A method for safely transporting an elongated item in a vehicle which comprises attaching a pair of devices, each comprising clamping means attached to a vehicle rail by a swivel head of a metal bolt, said clamping means permanently attached to a U-shaped hanging means, said hanging means comprising a flexible fastening device, on opposite ends of the rail;

placing the elongated item in the U-shaped hanging means such that each end of said item lies in one of the U-shaped hanging means;

fastening said item into place by pulling the flexible fastening device laterally across the elongated item which has been placed in the U-shaped hanging means; and transporting the elongated item safely.

17. The method of claim 16 wherein the vehicle containing the rail to which the devices are fastened is selected from the group consisting of a pickup truck, an automobile with a roof rack, and a boat.

18. The method of claim 16 wherein the step of attaching the devices that hold and transport the elongated items that are attached to the rail of the vehicle is done manually by a user by adjusting the swivel head of the metal bolt.

19. The method of claim 16 wherein the vehicle to which the devices are attached is a pickup truck equipped with a pair of said rails; each of said rails simultaneously utilized for transporting two groups of the elongated items using four devices, two on each rail.

* * * * *